Aug. 6, 1935.　　J. H. HUMBERSTONE　　2,010,722
WELDING ELECTRODE
Filed May 8, 1934
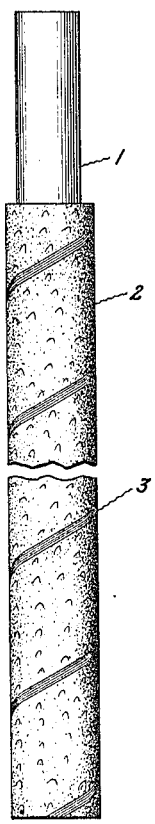
Inventor:
Joseph H. Humberstone,
by Harry E. Dunham
His Attorney.

Patented Aug. 6, 1935

2,010,722

UNITED STATES PATENT OFFICE 2,010,722

WELDING ELECTRODE

Joseph H. Humberstone, Schenectady, N. Y., assignor to General Electric Company, a corporation of New York Application May 8, 1934, Serial No. 724,512

10 Claims. (Cl. 219—8)

My invention relates to electrodes used in metallic arc welding.

In metallic arc welding an arc is maintained between the work to be welded and a rod, wire or strip of metal, usually referred to as an electrode. During welding the electrode is fused or vaporized, or both, and the metal thereof deposited upon and welded to the work as the electrode is fed toward the work to maintain the arc.

The quality of the weld metal deposited by such a process depends to a large extent upon the influence of certain elements or compounds associated with the electrode, usually in the form of a coating. Electrodes so coated are commonly referred to as flux coated electrodes.

It is an object of my invention to provide an improved fluxed electrode.

It is a further object of my invention to provide an electrode which is particularly suited for flat or horizontal welding, which has very good arcing characteristics with either direct current or alternating current and which is very easy to manipulate.

It is a further object of my invention to provide a flux for welding electrodes which will adequately protect the weld metal during the process of welding and which will form a slag which is characterized by its ability to cover the weld metal.

Further objects of my invention will appear from the following description taken in connection with the accompanying drawing which illustrates one embodiment thereof.

The electrode illustrated in the drawing comprises a metallic core 1 having a flux coating 2 of substantially the following composition:—

| | Per cent by weight |
|---|---|
| Feldspar | 39 |
| Ilmenite | 21 |
| Ferro-manganese | 9 |
| Liquid sodium silicate | 31 |

The essential ingredient of the above flux is ilmenite, the presence of which in substantial percentages in the flux causes it to form a slag which is characterized by its ability to cover the weld metal. If feldspar alone were used as a flux the slag resulting therefrom would be very viscous and would not flow readily over the weld and cover it. When ilmenite is added to feldspar the slag becomes fluid and its ability to cover the weld metal is increased. The surface of the weld metal also becomes smooth and of good appearance. The ferro-manganese employed is used as a deoxidizer. It also increases the fluidity of the weld metal. It is, of course, apparent that other deoxidizing materials may be employed in place of the ferro-manganese, and also that the deoxidizer may be completely omitted from the flux.

The feldspar may also be omitted from this flux without impairing its usefulness for most welding operations. When ilmenite constitutes from 10 to 60 per cent by weight of a flux the slag resulting therefrom is crystalline and characterized by its ability to cover the weld metal. As the amount of ilmenite employed in the flux is increased the slag resulting therefrom becomes more fluid and better able to cover the weld metal. Its behavior with feldspar is only characteristic of its behavior with similar materials such as asbestos, high melting point glasses, and the like. These materials are all silicates. Feldspars are aluminum-bearing alkaline-metal or alkaline-earth silicates. Asbestos is a magnesium-bearing silicate and glass is ordinarily a mixture of silicates. An increase in the amount of ilmenite in the flux causes the slag resulting therefrom to become less porous, thinner, and to adhere tighter to the weld metal.

In making a flux of the composition specified above, I use a potassium feldspar and a ferro-manganese of low carbon content. According to one method of manufacturing the flux, the feldspar, ilmenite and ferro-manganese are ground to a fine powder and mixed with liquid sodium silicate having a specific gravity of 40° Baumé, a $Na_2O$ content of about 8 per cent and a ratio of $Na_2O$ to $SiO_2$ of approximately 1 to 3.25. A silicate of this composition loses about ten per cent of its moisture on drying. When mixed with materials of the flux form a smooth paste which is applied to the electrode.

In the electrode illustrated in the drawing the flux has been applied to the core of the electrode in conjunction with a coating of fibrous material which is impregnated therewith. This fibrous material may be a cotton tape which is folded longitudinally about the core of the electrode with its edges abutting one another and parallel to the axis thereof as described and claimed in my copending application, Serial No. 648,651, filed December 23, 1932, for Welding electrodes and assigned to the same assignee as the present application. The tape is usually applied to the core of the electrode so as to obtain a substantial layer of flux between it and the core of the electrode.

In the process of manufacturing such an electrode it has been found desirable to hold the tape to the core of the electrode by means of a helical binding 3. This binding is made of a flat strip the turns of which are spaced a substantial distance from one another as illustrated in the drawing. By employing a flat strip the outside diameter of the electrode is not increased and the binding is less subject to destruction or removal from the electrode by reason of its engagement with foreign objects. In the electrode illustrated the binding is made of string formed of a plurality of untwisted strands of thread or vegetable fiber. The presence of this binding on the electrodes is a distinct advantage since it prevents the coating from warping or separating from the electrode core when the coating becomes damp or saturated with water as may occur from exposure to weather conditions. The binding when colored may indicate the flux composition employed on the electrode.

The percentages of flux material and cellulosic material applied to the electrode will vary with the size of the electrode as well as the use to which it is to be put. With quarter inch steel electrodes I am presently using a coating in which the flux material is about thirteen and a half per cent of the total weight of the electrode and in which the particular cellulosic material, cotton, is about one and a half per cent of the total weight of the electrode.

The electrode illustrated in the drawing is a short length rod such as would usually be employed in hand welding operation. The upper end of the electrode has been bared of flux in order to adapt it for use in an electrode holder by means of which welding current is supplied thereto. Electrodes may be made in accordance with my invention in long lengths for use in semi-automatic machines by means of which the electrode is fed toward and away from the work to strike and thereafter maintain a welding arc by means of a mechanism which functions in response to a characteristic of the welding arc such as its current or voltage. In such automatic machines the welding current may be supplied to the electrode through incisions made in the flux coating or other openings provided by removing a portion of the coating from the electrode.

When connected to a direct current source of supply an electrode having the above flux coating works best with reverse polarity, that is, when connected to the positive terminal of the source of supply. Best results are obtained, however, when using an alternating current source of supply. The electrode should be used only for flat welding and will produce welds which will meet the requirements of The American Society of Mechanical Engineers' boiler construction code for fired pressure vessels and Class 1 unfired pressure vessels, when welding with either alternating current or direct current. The operating voltage of the electrode is from 30 to 40 volts. The arcing characteristics of the electrode are very good, and the electrode is very easy to manipulate. One of the outstanding qualities of the electrode is that the weld metal does not boil under extreme heat conditions.

A core of substantially the following composition:

| | |
|---|---|
| Carbon | .13 to .18 per cent |
| Manganese | .40 to .60 per cent |
| Phosphorus | .04 per cent maximum |
| Sulphur | .04 per cent maximum |
| Silicon | .025 per cent maximum |
| Iron | Remainder | when coated with a welding flux of my above composition will produce, when welding boiler plate of fire box quality, weld metal of substantially the following qualities:

| | Direct current | Alternating current |
|---|---|---|
| Polarity | Reverse. | |
| Ultimate tensile lbs./in $^2$ | 70,000 to 78,000. | 65,000 to 70,000. |
| Elongation in 2''—% | 20 to 27. | 28 to 32. |
| Density | 7.81 to 7.83. | 7.82 to 7.84. |
| Free bend—% | 35 to 50. | 35 to 50. |
| Charpy ft. lbs | 22 to 33. | No record. |

It is of course apparent that a flux of the composition above specified will produce beneficial results whether it is applied to the electrode as a coating as above described or associated therewith in any other suitable manner. For example, the flux may be enclosed within a channel within the electrode or placed in grooves or depressions on the surface of the electrode without departing from my invention.

What I claim as new and desire to secure by Letters Patent of the United States is:

1. A welding electrode provided with a flux the essential slag forming ingredients of which are ilmenite and a substance of the group containing feldspars, asbestos and high melting point glasses, substantially two parts by weight of said substance being used with one part by weight of ilmenite.

2. A welding electrode provided with a flux of substantially the following initial composition: ilmenite, 60 per cent by weight; liquid sodium silicate, 30 per cent by weight; and a deoxidizing material, 10 per cent by weight.

3. A welding electrode having the flux coating resulting from applying thereto a mixture of substantially equal parts by weight of feldspar, ilmenite and liquid sodium silicate.

4. A welding electrode having the coating resulting from applying thereto a mixture of substantially equal parts by weight of feldspar, ilmenite and liquid sodium silicate to which has been added a deoxidizer having a weight of approximately ten per cent of the combined weights of these ingredients.

5. A welding electrode provided with a flux of substantially the following initial composition: feldspar, 39 per cent by weight; ilmenite, 21 per cent by weight; ferro-manganese, 9 per cent by weight; and liquid sodium silicate, 31 per cent by weight.

6. A welding electrode having a coating resulting from impregnating a cellulose material with a flux of substantially the following composition; feldspar, 39 per cent by weight; ilmenite, 21 per cent by weight; ferro-manganese, 9 per cent by weight; and liquid sodium silicate, 31 per cent by weight.

7. A weld-rod having a coating containing ilmenite, a substance of the group containing aluminum-bearing and magnesium-bearing silicates, and a binder silicate, with each of the first two forming from 10% to 40% of the total of the three.

8. A weld-rod having a coating containing ilmenite, an aluminum-bearing alkali-metal or alkaline-earth silicate, and a binder silicate, with each of the first two forming from 10% to 40% of the total of the three.

9. A welding electrode having the coating resulting from applying thereto a mixture of substantially equal parts by weight of a substance of the group containing aluminum-bearing and magnesium-bearing silicates, ilmenite and liquid sodium silicate to which has been added a deoxidizer having a weight of approximately ten per cent of the combined weight of these ingredients.

10. A welding electrode having the flux coating resulting from applying thereto a mixture of substantially equal parts by weight of a substance of the group containing feldspars and asbestos, ilmenite, and liquid sodium silicate.

JOSEPH H. HUMBERSTONE.